Sept. 10, 1935. M. W. BEST Re. 19,693
STOKER
Original Filed Oct. 6, 1930
FIG. 1.
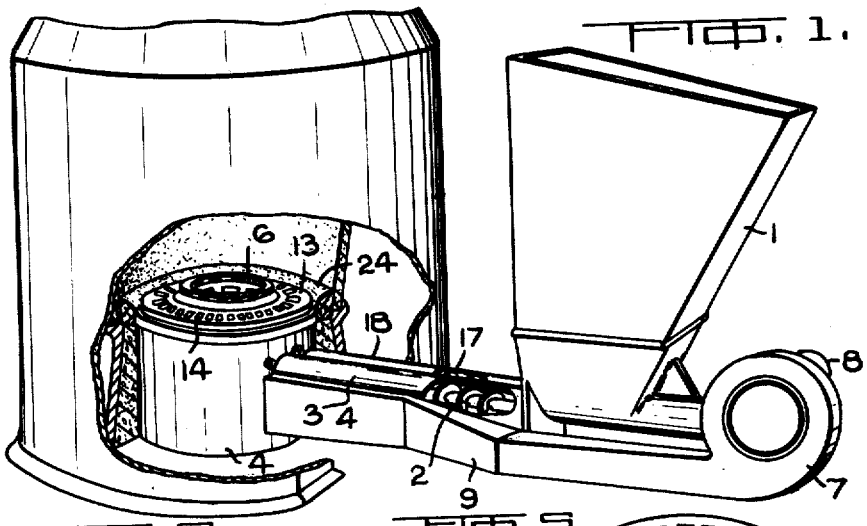
FIG. 2.
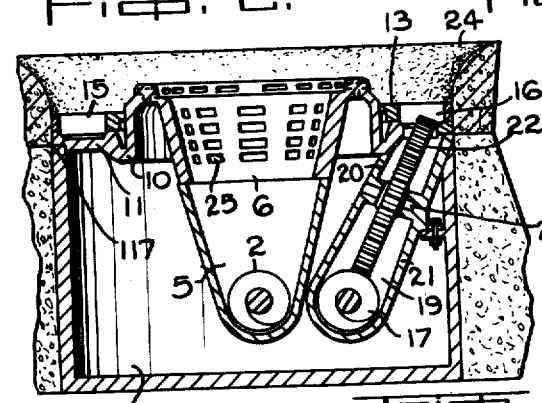
FIG. 5.
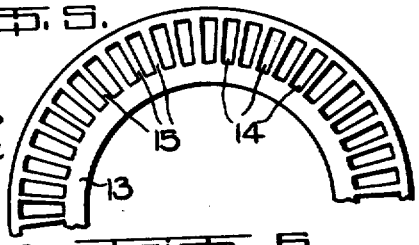
FIG. 6.
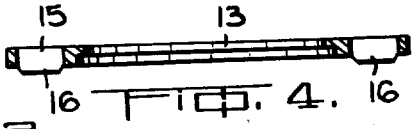
FIG. 4.
FIG. 3.
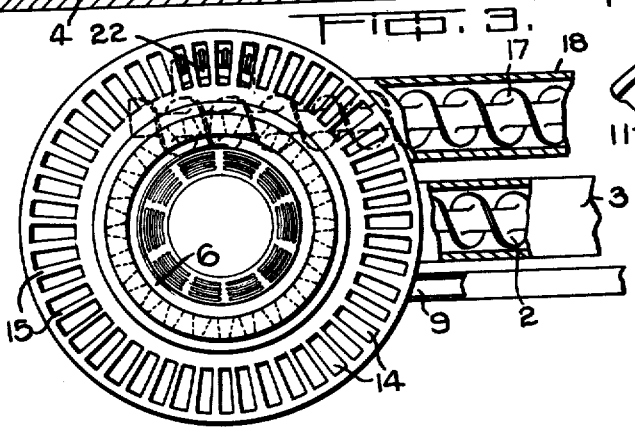
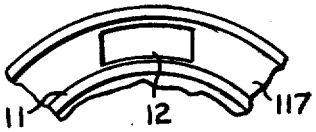
Inventor
MILLARD W. BEST
By J. E. M. Fetherstonhaugh
Attorney Reissued Sept. 10, 1935 Re. 19,693

UNITED STATES PATENT OFFICE 19,693

STOKER

Millard Whyte Best, Hamilton, Ontario, Canada

Original No. 1,871,653, dated August 16, 1932, Serial No. 486,596, October 6, 1930. Application for reissue August 6, 1934, Serial No. 738,734. In Canada June 26, 1930

8 Claims. (Cl. 110—45)

My invention relates to improvements in stoker mechanisms for furnaces, and the object of my invention is to devise a stoker in which an ash receiving ring constituting the base of the fire pot has a rotative movement for the removal of ashes.

A still further object of my invention is to provide a conveyer mechanism for removing the ashes from the furnace, and to utilize the movement of such conveyer mechanism as a means for rotating an ash receiving ring constituting the fire pot base, and another object of my invention is to incorporate my ash removing mechanism in a standard underfeed stoker in a very simple way using a minimum of parts and driving connections.

My invention consists of a stoker mechanism constructed and arranged all as hereinafter more particularly described and illustrated in the accompanying drawing in which:

Fig. 1 is a perspective view of my screw mechanism together with a fragmentary portion of the furnace to which it is connected.

Fig. 2 is a vertical cross sectional view through the air draft chamber, tuyère containing member or retort, and coal delivery and ash removal conveying screws.

Fig. 3 is a plan view of the rotatable ash receiving ring tuyère and a fragmentary portion of the fuel conveyers, such conveyers being partly shown in section.

Fig. 4 is a plan view of a fragmentary portion of the flange of the tuyère containing member or retort upon which the rotatable ash receiving ring is mounted.

Fig. 5 is a plan view of a fragmentary portion of the rotatable ash receiving ring, and Fig. 6 is a vertical cross sectional view through the ring illustrated in Fig. 5.

Like characters of reference indicate corresponding parts in the different views in the drawing.

The mechanism for feeding the fuel into the furnace in which I incorporate my stoker together with the air draft delivery mechanism follows standard practice and consists of a fuel hopper 1 positioned exteriorly of the furnace in close proximity thereto, the fuel being carried therefrom by a screw conveyer contained within a housing 3 which extends into an air draft chamber 4 and opens into a trough 5 connected with the tuyère containing member or retort 6 mounted upon the open top of the air draft chamber 4. The air draft is supplied by a fan actuated by a motor 8 which also actuates the screw conveyer 2, such fan being furnished with an air conduit 9 which connects with the air draft chamber 4, the air draft passing from out of the tuyères through the orifices 25.

The tuyère containing member or retort 6 is specially designed for the incorporation of my ash removal mechanism and is formed at its lower outer edge 10 with a horizontal circular flange or base plate 11 the outer edge of which is seated upon the upper edge of the air draft chamber 4. The flange 11 is formed with an orifice 12 through which the ashes fall and are carried out of the furnace as shall be hereinafter explained.

Upon the outer face of the flange 11 I seat the ring 13 having a plurality of radially extending ash receiving orifices 14 formed therein, such ring being rotatable and constituting the base of the fire pot 24.

In designing my mechanism so that the ring 13 may be rotatable I form the bottoms of the ribs 15 between the orifices 14 into teeth 16 which project downwardly into a circular channel 117 in the top of the flange 11 so that the ring constitutes a flat horizontal gear having teeth upon its lower face and orifices between the teeth.

For removing the ashes from the furnace I provide a screw conveyer 17 which connects with any suitable ash receiving receptacle, such screw conveyer extending along a conveyer casing 18 which passes into the air draft chamber 4 and opens into a trough 19. The walls 20 and 21 of this trough extend upwardly into connection with the lower face of the tuyère containing member or retort flange 11 on each side of the orifice 12, as will be clearly seen upon reference to Fig. 2.

Between the walls 20 and 21 of the trough 19 I position a gear wheel 22 freely rotatable upon a spindle 23. This gear wheel meshes with the ash removal screw 17 and also with the teeth 16 upon the ring 13. It will be therefore understood that the rotation of the screw 17 will rotate the gear 22 and the ring 13. The motor 8 is connected to the conveyer screws 2 and 17 by means of any suitable mechanism so that the screw conveyer 2 carries fuel into the furnace and the screw conveyer 17 carries the ash or burnt fuel from out of the furnace.

The operation of my device is as follows:—

When the screw mechanism is in operation the fuel is carried from the hopper 1 along the conveyer casing 3 into the trough 5 and up through the interior of the tuyère containing member or retort 6 from whence it spills into the fire pot 24, the air draft from the chamber 4 passes through the tuyère orifices 25 into the burning fuel in the top of the tuyère containing member or retort and into the fire pot 24.

As the screw conveyer 2 rotates to feed the fuel into the furnace the ash removing screw also rotates to remove the ash or burnt fuel from out of the furnace, and as the gear 22 which meshes with the teeth 16 of the ring 13 also meshes with the flight of the screw 17 it will be apparent that the ring 13 will slowly rotate as the screw 17 revolves.

The rate of rotation of the ring 13 will be extremely slow as the screw 17 rotates slowly with the consequent very slow movement of the gear 22.

As the fuel in the fire pot burns the ash falls down onto the face of the ring 13 and enters the orifices 14 in the ring, and as the ring is rotating these orifices will be successively carried over the orifice 12 in the flange 11, whereby the ashes will drop from such through the orifice 12 as they pass thereover. The ashes upon passing into the orifice 12 drop downwardly into the trough 19 from whence they are conveyed out of the furnace by the screw 17.

From the foregoing description it will be seen that I have devised a particularly simple and effective stoker mechanism which will constantly remove the ash from the furnace, thus preventing it from accumulating and therefore ensuring a very hot burning fire bed at all times, and although I have shown and described a particular embodiment of my invention it is to be understood that I can make such changes and alterations as I may from time to time deem necessary without departing from the spirit of my invention as set forth in the appended claims.

What I claim as my invention is:

1. In a furnace, the combination of a fire pot and a base plate therefor having an ash discharge orifice, and an ash removing mechanism incorporating a screw conveyor and having an ash inlet registering with the ash discharge orifice in the base plate, of a rotatable ash ring supported on the base plate and having ash receiving orifices therein, said base plate coacting with the ash ring to retain the ashes in the orifices in the latter until such orifices register with the ash discharge orifice in such base plate, and means between the ash ring and the flight of the ash removing mechanism conveyor screw for successively bringing the orifices in the ash ring into register with the discharge orifice in the base plate and the registering ash inlet of the ash removing mechanism.

2. In a furnace, the combination of a fire pot and a base plate therefor having an ash discharge orifice, and an ash removing mechanism incorporating a screw conveyor and having an ash inlet registering with the ash discharge orifice in the base plate, of a rotatable ash ring supported on the base plate and having ash receiving orifices therein, said base plate coacting with the ash ring to retain the ashes in the orifices in the latter until such orifices register with the ash discharge orifice in such base plate, and means between the ash ring and the flight of the ash removing mechanism conveyor screw extending through the ash inlet of the ash removing mechanism and through the ash discharge orifice in the base plate for successively bringing the orifices in the ash ring into register with the discharge orifice in the base plate and the registering ash inlet of the ash removing mechanism.

3. In a furnace, the combination of a fire pot and a base plate therefor having an ash discharge orifice, and an ash removing mechanism incorporating a screw conveyor and having an ash inlet registering with the ash discharge orifice in the base plate, of a rotatable ash ring supported on the base plate and having ash receiving orifices therein, said base plate coacting with the ash ring to retain the ashes in the orifices in the latter until such orifices register with the ash discharge orifice in such base plate, teeth on the rotatable ash ring, and a gear wheel journalled in the ash removing mechanism meshing with the flight of the screw conveyor screw thereof and also extending through the ash inlet of the ash removing mechanism and through the ash discharge orifice in the base plate and meshing with the teeth on the ash ring.

4. A furnace as claimed in claim 3 wherein the teeth on the ash ring are formed on ribs constituted in the ring between the ash receiving orifices.

5. In a furnace, the combination of a fire pot and a base plate therefor having an ash discharge orifice, and an ash removing mechanism incorporating a screw conveyor and having an ash inlet registering with the ash discharge orifice in the base plate, of a tuyère containing member or retort formed centrally in the base plate and opening to the fire pot, of a rotatable ash ring surrounding the tuyère containing member and mounted on the portion of the base plate disposed outwardly of the periphery of such tuyère containing member, said ash ring having ash receiving orifices therein, said base plate coacting with the ash ring to retain the ashes in the orifices in the latter until such orifices register with the ash discharge orifice in such base plate, and means between the ash ring and the flight of the ash removing mechanism conveyor screw for successively bringing the orifices in the ash ring into register with the discharge orifice in the base plate and the registering ash inlet of the ash removing mechanism.

6. In a furnace, the combination of a fire pot and a base plate therefor having an ash discharge orifice, and an ash removing mechanism incorporating a screw conveyor and having an ash inlet registering with the ash discharge orifice in the base plate, of a tuyère containing member or retort formed centrally in the base plate and opening to the fire pot, a rotatable ash ring surrounding the tuyère containing member and mounted on the portion of the base plate disposed outwardly of the periphery of such tuyère containing member, said ash ring having ash receiving orifices therein, said base plate coacting with the ash ring to retain the ashes in the orifices in the latter until such orifices register with the ash discharge orifice in such base plate, and means between the ash ring and the flight of the ash removing mechanism conveyor screw extending through the ash inlet of the ash removing mechanism and through the ash discharge orifice in the base plate for successively bringing the orifices in the ash ring into register with the discharge orifice in the base plate and the registering ash inlet of the ash removing mechanism.

7. In a furnace, the combination of a fire pot and a base plate therefor having an ash discharge orifice, and an ash removing mechanism incorporating a screw conveyor and having an ash inlet registering with the ash discharge orifice in the base plate, of a tuyère containing member or retort formed centrally in the base plate and opening to the fire pot, a rotatable ash ring surrounding the tuyère containing member and mounted on the portion of the base plate disposed outwardly of the periphery of such tuyère containing member, said ash ring having ash receiving orifices therein, said base plate coacting with the ash ring to retain the ashes in the orifices in the latter until such orifices register with the ash discharge orifice in such base plate, teeth on the rotatable ash ring, and a gear wheel journalled in the ash removing mechanism meshing with the flight of the screw conveyor screw thereof and also extending through the ash inlet of the ash removing mechanism and through the ash discharge orifice in the base plate and meshing with the teeth on the ash ring.

8. A furnace as claimed in claim 5 wherein the teeth on the ash ring are formed on ribs constituted in the ring between the ash receiving orifices.

MILLARD WHYTE BEST.